(12) United States Patent
Agans

(10) Patent No.: US 12,396,436 B1
(45) Date of Patent: Aug. 26, 2025

(54) COOLER FOR PETS

(71) Applicant: Christine A. Agans, Camdenton, MO (US)

(72) Inventor: Christine A. Agans, Camdenton, MO (US)

( * ) Notice: Subject to any disclaimer, the term of this patent is extended or adjusted under 35 U.S.C. 154(b) by 0 days.

(21) Appl. No.: 18/910,144

(22) Filed: Oct. 9, 2024

(51) Int. Cl.
| | | |
|---|---|---|
| *A01K 5/01* | (2006.01) | |
| *B65D 25/04* | (2006.01) | |
| *B65D 25/24* | (2006.01) | |
| *B65D 25/28* | (2006.01) | |
| *B65D 43/16* | (2006.01) | |
| *B65D 43/22* | (2006.01) | |
| *B65D 51/18* | (2006.01) | |
| *B65D 51/28* | (2006.01) | |
| *B65D 53/02* | (2006.01) | |
| *B65D 81/38* | (2006.01) | |

(52) U.S. Cl.
CPC ............ *A01K 5/0107* (2013.01); *B65D 25/04* (2013.01); *B65D 25/24* (2013.01); *B65D 25/28* (2013.01); *B65D 43/165* (2013.01); *B65D 43/22* (2013.01); *B65D 51/18* (2013.01); *B65D 51/28* (2013.01); *B65D 53/02* (2013.01); *B65D 81/3813* (2013.01); *B65D 2251/0021* (2013.01); *B65D 2251/0084* (2013.01); *B65D 2525/287* (2013.01); *B65D 2543/00194* (2013.01); *B65D 2543/00972* (2013.01)

(58) Field of Classification Search
CPC ........................................................ F25D 3/08
See application file for complete search history.

(56) References Cited

U.S. PATENT DOCUMENTS

| | | | | |
|---|---|---|---|---|
| 3,395,550 | A * | 8/1968 | Dungan | .................... F25D 3/08 |
| | | | | 62/464 |
| 2004/0178208 | A1* | 9/2004 | Leba | ......................... F25D 3/08 |
| | | | | 220/761 |
| 2018/0149400 | A1* | 5/2018 | Valencia | ................... F25D 3/06 |
| 2021/0227787 | A1* | 7/2021 | Friedgood | .............. A45C 13/02 |

* cited by examiner

*Primary Examiner* — Elizabeth J Martin
(74) *Attorney, Agent, or Firm* — Dale J. Ream

(57) ABSTRACT

A food and beverage cooler for pets includes a cooler housing having a bottom wall and upstanding sidewalls that together define an interior compartment and an open top, the interior compartment being partitioned into two compartments for separate storage of food and water. A first lid portion is pivotally coupled to the cooler housing and is movable between open and closed configurations regulating access to the food and water and having an upper surface defining a pair of food and water bowls. A second lid portion is pivotally coupled atop the first lid portion and is pivotally movable between open and closed configurations, the food and water bowls being accessible only when the second lid portion is at said open configuration. The second lid portion includes a recessed underside into which a zippered pouch is mounted and configured to hold pet toys.

14 Claims, 7 Drawing Sheets

COOLER FOR PETS

BACKGROUND OF THE INVENTION

This invention relates generally to ice chest coolers and, more particularly, to a cooler configured specifically for pets having partitioned compartments for containing food and water, respectively and having a lid whose under surface is configured to define food and beverage bowls, respectively.

Portable pet food coolers have long been an essential accessory for pet owners on the go, offering a means to keep food fresh and water cool during outings or travels. However, traditional designs often fail to meet the diverse needs of pets and their owners. Most pet food coolers feature only a single compartment for storing both food and water. This design forces food and water to share the same space, potentially compromising hygiene and cleanliness. Moreover, the lack of separation can hinder proper organization, especially when both dry food and wet food options are necessary.

Furthermore, pets require a dedicated eating and drinking area separate from food and water storage areas. Unfortunately, pet food coolers make no such provision, forcing pet owners to improvise or carry additional accessories, which can be cumbersome. Pet food coolers also lack storage options for pet-related items such as treats, medicines, and grooming supplies—essentials which must then be carried in separate bags or containers. Together, these shortcomings lower efficiency in packing and storage and increase stress for the pet owner, who must keep mental track of a plethora of items.

Although a few compartmentalized pet food coolers are known in the prior art, they neither incorporate a designated space for eating and drinking nor provide additional storage options for pet-related items. A compartmentalized pet food cooler including these elements would thus constitute an improvement over all prior pet food coolers. Such an invention would be capable of consolidating all essential pet supplies into one convenient unit, streamlining travel plans, and setting a new industry standard in accessibility and functionality for pet owners.

Therefore, it would be desirable to have a food and beverage cooler for pets compartmentalized so as to separately store pet food and water. Further, it would be desirable to have a compartmentalized food and beverage cooler for pets incorporating food and water bowls into its design as a designated eating and drinking area for pets. Even further, it would be desirable to have a compartmentalized food and beverage cooler for pets including a zippered pouch capable of storing smaller pet-related accessories. Also, it would be desirable for this cooler to be insulated and have additional features facilitating ease of transportation.

SUMMARY OF THE INVENTION

Accordingly, a food and beverage cooler for pets according to a preferred embodiment of the present invention includes side and bottom walls defining an interior compartment partitioned into two compartments for separate storage of food and water, and a pair of lid portions atop the side walls, which may be coupled to a rear side wall via a hinge and securable in a closed configuration via a latching mechanism. Respective lid portions may further comprise (1) an upper surface defining one or more concave or recessed areas configured to serve as food and water bowls and (2) a zippered pouch configured to hold pet-related articles. The first lid portion and interior compartment may include insulation to maintain the temperature of the pet food and water. The cooler may further include a handle and plurality of wheels to enhance functionality and ease of transportation as subsequently described.

Therefore, a general object of this invention is to provide a compartmentalized food and beverage cooler for pets capable of separately storing pet food and water.

Another object of this invention is to provide a compartmentalized food and beverage cooler for pets incorporating food and water bowls into its design, thereby integrating both a food and water storage area and an eating and drinking area into a single device.

Still another object of this invention is to provide a compartmentalized food and beverage cooler for pets having storage areas for pet-related accessories, thereby combining all essential pet supplies into one convenient unit.

Yet another object of this invention is to provide a compartmentalized food and beverage cooler for pets that is highly functional and easy to use and transport.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 7a is a side view of the food and beverage cooler as in FIG. 1a.

FIG. 7b is a sectional view taken along line 7b-7b of FIG. 7a.

DESCRIPTION OF THE PREFERRED EMBODIMENT

Figure 1A:
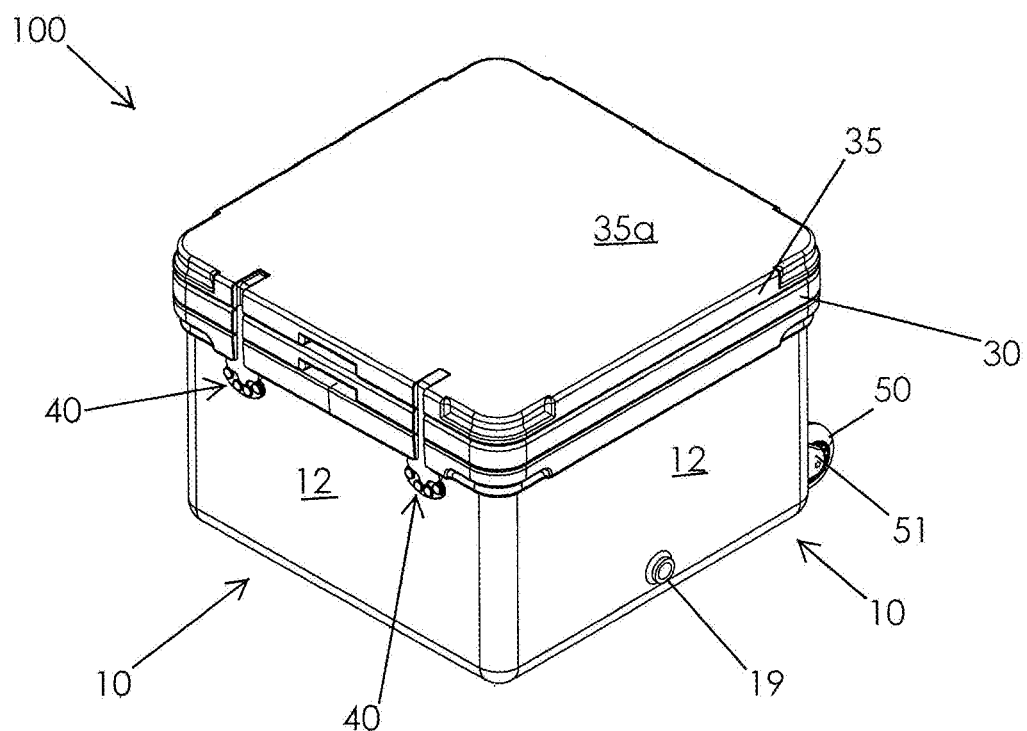
FIG. 1a is a rear perspective view of the food and beverage cooler for pets according to a preferred embodiment of the present invention.

A compartmentalized food and beverage cooler for pets according to a preferred embodiment of the present invention will now be described in reference to the accompanying drawings. The food and beverage cooler for pets (referred to as the "cooler") 100 includes a plurality of exterior walls 10, a partition 20, first lid portion 30, and a second lid portion 35. The cooler 100 may also include a plurality of wheels 50 and a handle 60.

More particularly, the exterior walls 10 of the cooler include a bottom wall 11 having a flat configuration suitable for resting on a flat surface and a plurality of side walls 12 extending upwardly and away from the bottom wall 11 (FIG. 1). Together, the bottom and side walls 11, 12 define an interior compartment 13 (FIG. 5) into which pet food and water may be placed and an open top by which the pet food and water may be accessed. In one embodiment, the side walls 12 have a flat configuration and meet each other at right angles, defining a square or rectangular shaped interior compartment 13. In another embodiment, the side walls 12 form angles of more or less than 90 degrees or, alternatively, form no discernible angles at all, so as to define an interior compartment 13 that is oval, circular, or non-geometric in shape.

Figure 5:
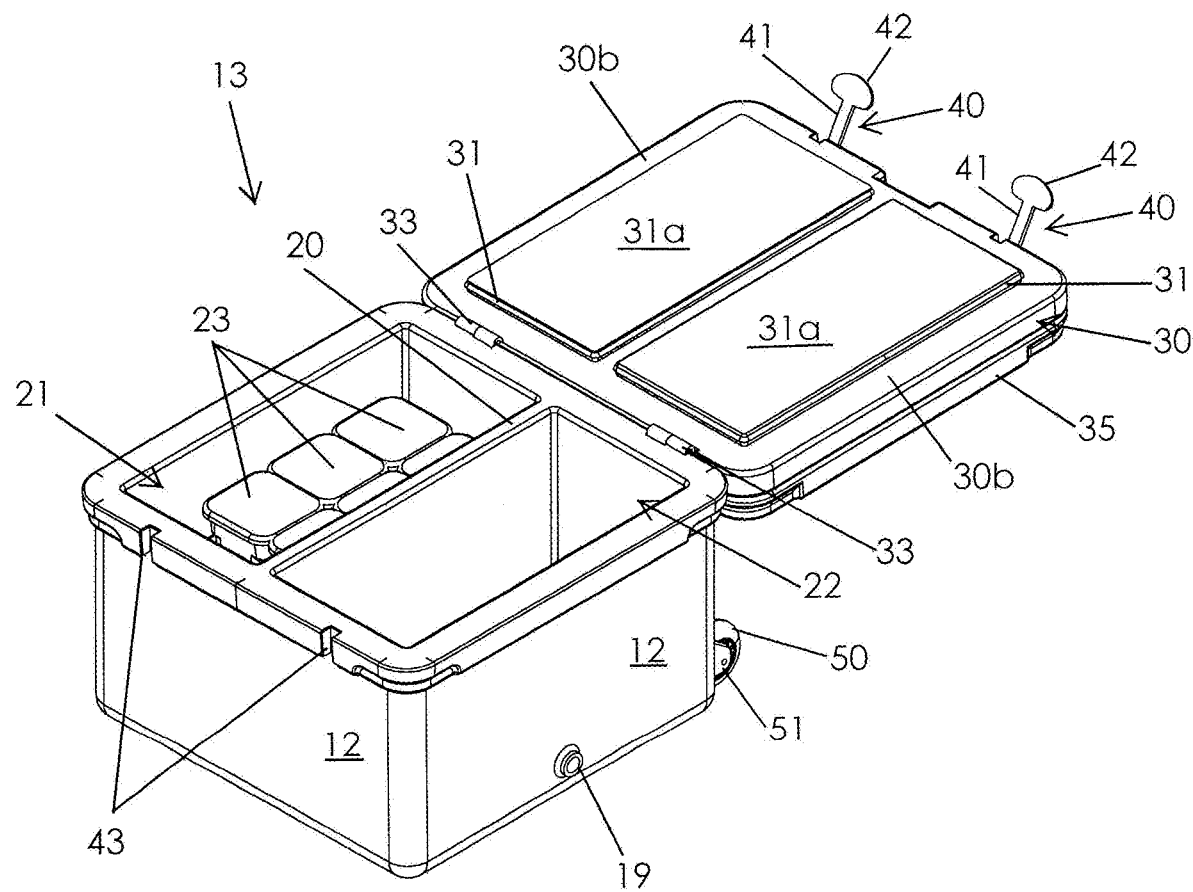
FIG. 5 is another perspective view of the food and beverage cooler as in FIG. 1a, illustrated with the first and second lid portions in open configurations, respectively.

In an important aspect, the partition 20 extends vertically away from the bottom wall 11 in a direction parallel to the plurality of side walls 12 and horizontally away from one of the side walls 12 to an opposite side wall 12. Thus, the partition 20 divides the interior compartment 13 into two separate compartment portions having similar dimensions and essentially equal volumes, as shown in FIG. 5. The top of the partition 20 is even, or nearly even, with the tops of the side walls 12. The partition 20 may be made of the same material as the exterior walls 10 and share a unitary construction.

The two compartment portions defined by the partition 20 may include a first compartment portion 21 configured to store pet food and a second compartment portion 22 configured to store water. Preferably, the compartment portions are positioned laterally adjacent one another. More precisely, the two compartment portions 21, 22 are configured to store a plurality of food containers 23 and water containers 24, respectively, the plurality of containers 23, 24 directly holding the pet food and water and one or more ice packs 25 being operative to maintain a desired temperature within the interior area of the cooler 100. The two compartment portions 21, 22 and the plurality of containers 23, 24 are exemplified in FIG. 6. It is understood that the plurality of food and water containers 23, 24 may be any of the myriad types available on the market. Alternatively, the two compartment portions 21, 22 may be configured to have pet food and water placed directly into them. In this embodiment, means for selectively draining or dispensing the water in the second compartment portion 22 may be necessary. Thus, one of the side walls 12 of the second compartment portion 22 may define an aperture located adjacent the bottom wall 11 and having dimensions for receiving and securely holding a plug 19 in a friction fit arrangement (i.e. the plug is removably positioned within the aperture to prevent unwanted loss of water). In variations of this embodiment, the plug 19 may be removably connected to the aperture via a snap-on or screw-on arrangement.

Further, the first and second lid portions 30, 35 are positioned atop the plurality of side walls 12. A rear edge of the first lid portion 30 is pivotally coupled to an upper rear edge of a corresponding side wall 12, making the first lid portion 30 pivotally movable between a closed configuration blocking access to the interior compartment 13 and an open configuration allowing access to the interior compartment 13 (see FIG. 1b). An upper rear edge of the second lid portion 35 is pivotally coupled to the rear edge of the first lid portion 30, making the second lid portion 35 pivotally movable between a closed configuration resting atop the first lid portion 30 and an open configuration displaced from the first lid portion 30. Means for pivotally coupling together the lid portions 30, 35 and the respective side wall 12 may include one or more hinges 33, which may be of any generic type, size, and material. When both lid portions 30, 35 are in the closed configuration, they appear to be in a vertically stacked arrangement, the second 35 above the first 30, with no space between.

Figure 6:
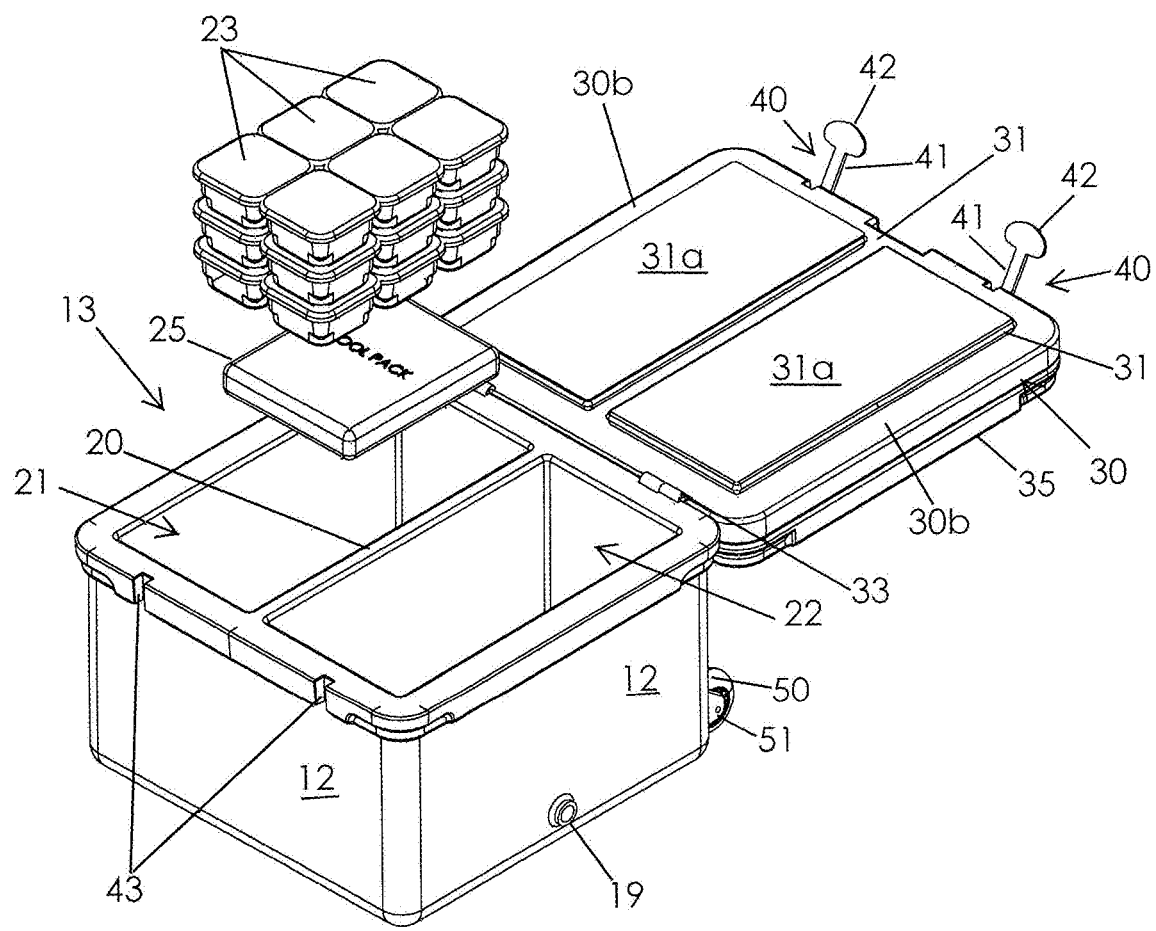
FIG. 6 is an exploded view of the food and beverage cooler as in FIG. 5.

Each of the lid portions 30, 35 comprises a top surface 30a, 35a and a bottom surface 30b, 35b opposite the top surface 30a, 35a, respectively. Preferably, the bottom surface 30b of the first lid portion 30 includes a raised area or lip 31, the lip 31 being configured to mate with the partition 20 and plurality of side walls 12 in a friction fit arrangement (i.e. the lip 31 is removably positioned within the open top of the interior compartment 13 as defined by the plurality of side walls 12). This arrangement is illustrated in FIGS. 5 and 6. When closed, the bottom surface 30b of the first lid portion 30 lies flush atop and in contact with the partition 20 and plurality of side walls 12. Moreover, the lip 31 creates a watertight, and preferably airtight, seal with the partition 20 and plurality of side walls 12 by means of a pair of seal members 31a. The seal's primary purpose is to prevent spillage during transport, either from the cooler 100 to its exterior environment, or from one of the compartment portions 21, 22 to the other. The seal may even have a thermal effect, helping maintain the temperature of the pet food and water.

Figure 3A:
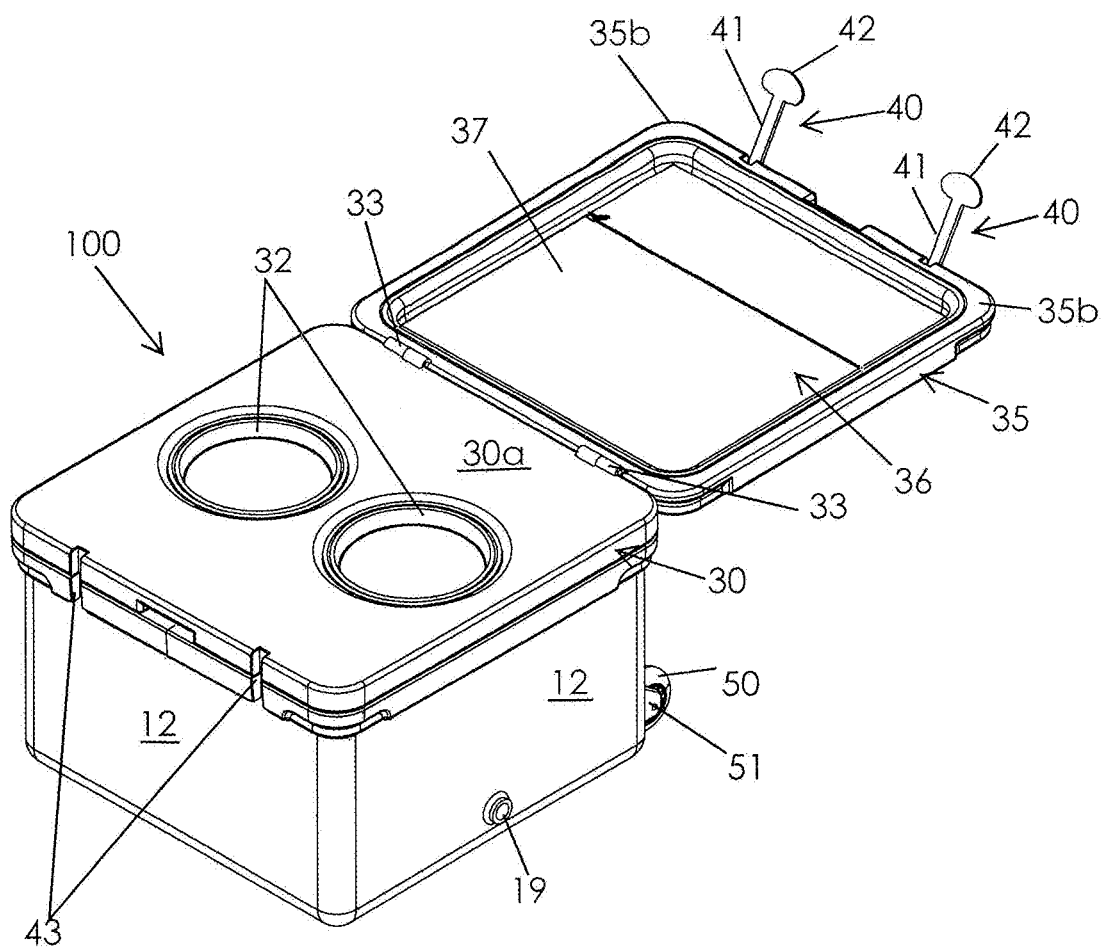
FIG. 3a is a perspective view of the food and beverage cooler for pets as in FIG. 1a, illustrated with a second lid portion and an open configuration.
Figure 3B:
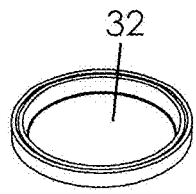
FIG. 3b is an isolated view of a collapsible bowl according to the present invention illustrated in a collapsed configuration.
Figure 3C:
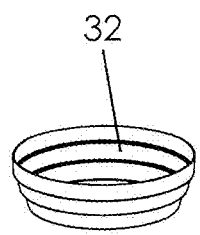
FIG. 3c is an isolated view of a collapsible bowl according to the present invention illustrated in an expanded configuration.

In a critical aspect, the top surface 30a of the first lid portion 30 defines at least one recessed area 32 having a concave construction and configured to hold a serving of pet food or water. Preferably, the top surface 30a defines a pair of recessed areas 32 located laterally adjacent one another, at least one of which is configured as a water bowl, and at least one, as a food bowl (FIGS. 3a, 3b). It should be noted that these recessed areas 32 may only be accessed as food or water bowls if the first lid portion 30 is in the closed configuration and the second lid portion is in the open configuration. Furthermore, the recessed areas 32 may have a collapsible silicone construction, each recessed area 32 featuring a collapsible sidewall removably positioned within the recessed area 32 itself.

Figure 4:
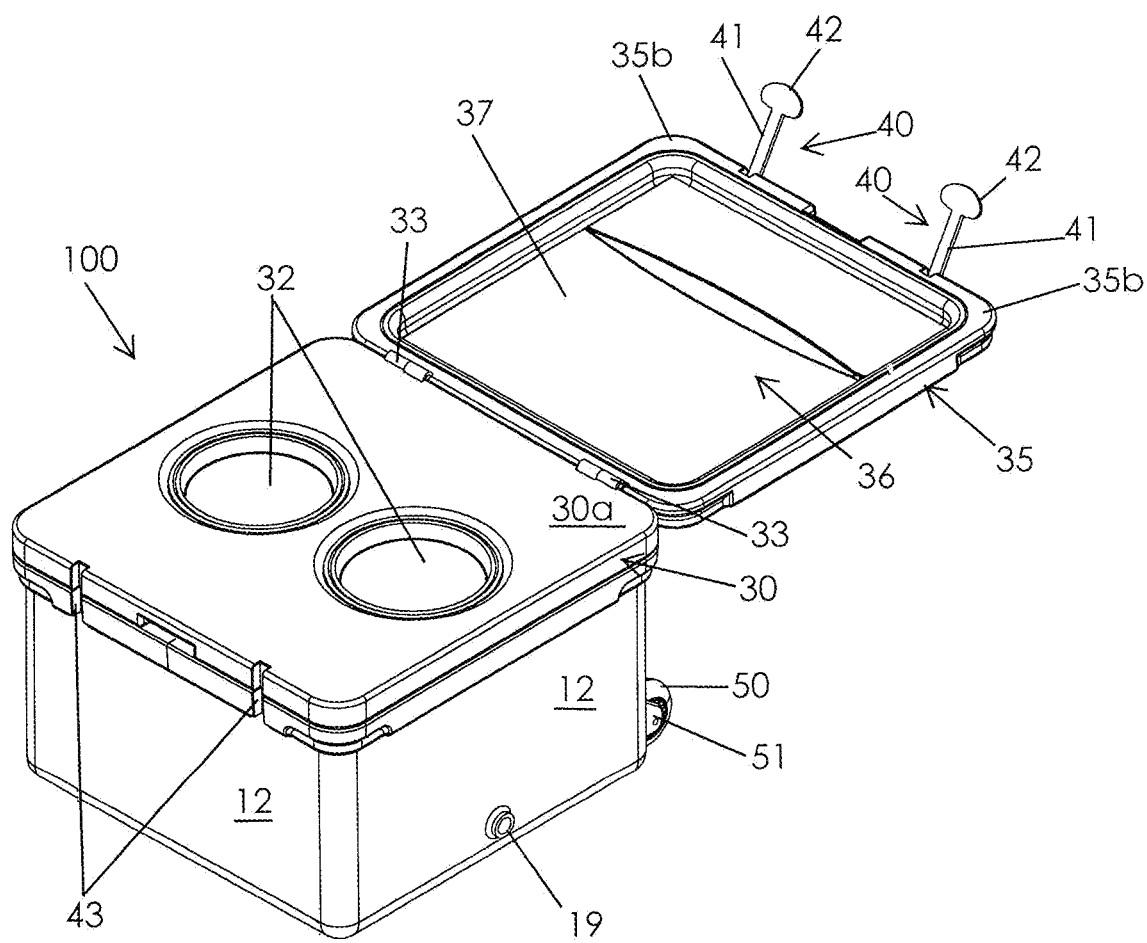
FIG. 4 is another perspective view of the food and beverage cooler as in FIG. 3a, illustrated with the zipper pouch shown in an open configuration.

In another critical aspect, the bottom surface 35b of the second lid portion 35 may define a storage area 36 in which a zippered pouch 37 is mounted, such as by a pair of Velcro or magnetic strips. It is important that the zippered pouch 37 be detachable, should the pet owner wish to clean the storage area 36 and zippered pouch 37 of food and grime. An upper edge of the zippered pouch 37 is operable between an open configuration allowing its contents to be accessed, and a closed configuration prohibiting its contents from being accessed (FIGS. 3a, 4). Additionally, the zippered pouch 37 has dimensions suitable for holding pet-related articles such as treats, medicines, and grooming supplies and may be constructed of a clear plastic material so that its contents can be visualized with minimal difficulty or inconvenience.

Figure 1B:
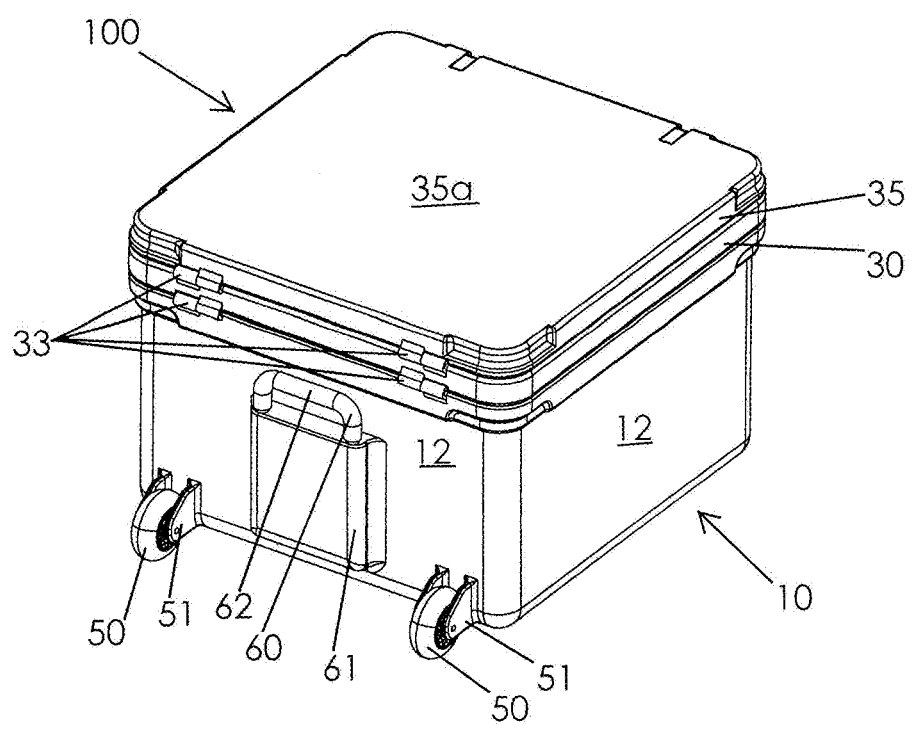
FIG. 1b is a front perspective view of the food and beverage cooler according to the present invention.
Figure 2:
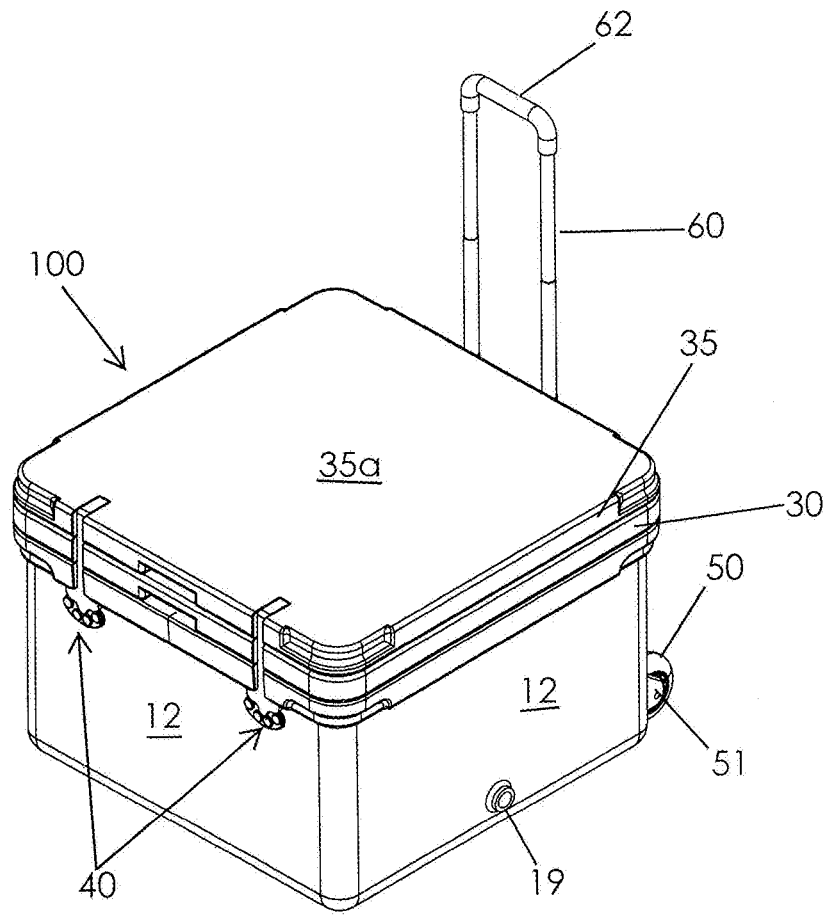
FIG. 2 is another perspective view of the food and beverage cooler for pets as in FIG. 1a, illustrated with the handle in a deployed configuration.

Further, the lid 30 may include one or more latch mechanisms 40 operable to selectively secure the first and second lid portions 30, 35 in the closed configuration when actuated. In the preferred embodiment, the one or more latch mechanisms 40 comprise a shaft portion 41 fixedly attached to an edge of the top surface 35a of the second lid portion 35 and a flange 42 coupled to an end of the shaft 41 opposite the shaft's 41 point of connection with the second lid portion 35. The flange 42 extends perpendicularly outward and away from the shaft 41 in a direction parallel to a respective side wall 12 (FIGS. 1a, 2). As a creative touch, the latch mechanism may even incorporate a fun or themed design, such as the paw of a dog or cat. To actuate the latch mechanism 40, an edge of both lid portions 30, 35 and an edge of the respective side wall 12 together define a continuous groove 43 into which the shaft 41 may be removably positioned. When the shaft 41 is thus positioned within the groove 43, the flange 42 forms a mechanical connection with the respective side wall 12 and prevents the lid portions 30, 35 from being raised or otherwise removed from the closed configuration. In some embodiments, additional latch mechanisms 40 may be included securing the first and second lid portions 30, 35 to each other but not to a respective side wall 12, or securing only the first lid portion 30 to a respective side wall 12 and not the second lid portion 35. The purpose of such latch mechanisms 40 would be to promote flexibility in the use of the cooler 100. Finally, it should be understood that other latch mechanisms 40 may be used besides the one herein described.

Figure 7A:
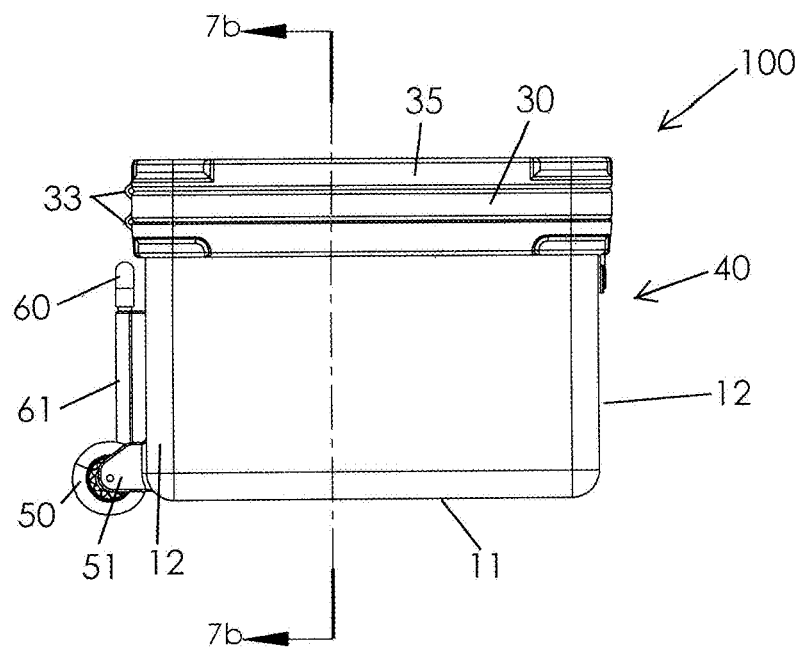
Figure 7B:
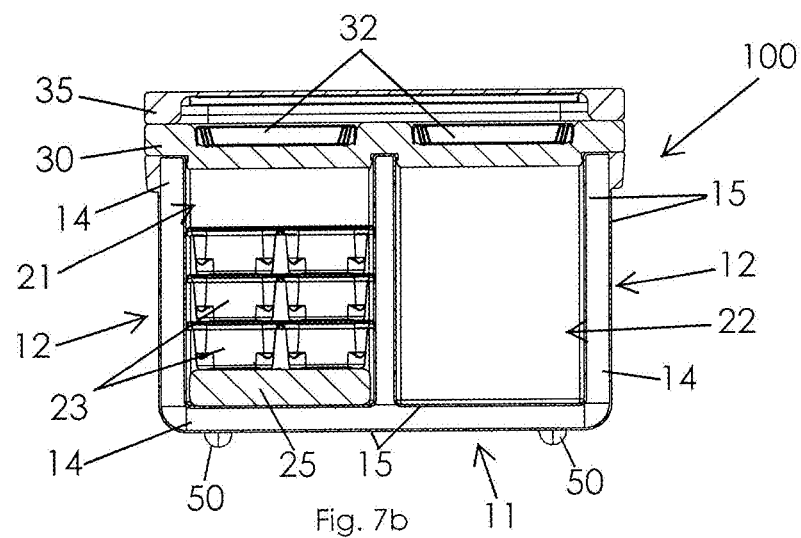

Even further, the lid portions 30, 35 and exterior walls 10 may be constructed of natural or synthetic materials and/or a combination thereof. If plastic is used, the cooler 100 may be constructed in a rotational mold for increased strength and durability. Additionally, the lid portions 30, 35 and exterior walls 10 may include insulating material 14 to maintain the temperature of the food and water. At a minimum, the insulating material 14 is mounted on at least the bottom surface 30b of the first lid portion 30 and the interior surfaces of the sidewalls 12. If more extensive insulation is desirable, the partition 20, lid portions 30, 35, and exterior walls 10 may comprise a shell 15 defining the interior and exterior surfaces of the cooler 100 (see FIG. 7b). The entirety of the shell 15 may have a unitary construction and define a void into which an insulating material 14 may be placed intermediate the interior and exterior of the cooler 100. Preferably, the insulating material 14 is either Styrofoam or polyurethane, although other materials may suffice.

To facilitate mobility and transportation, the cooler 100 may comprise additional features. Especially in larger, heavier embodiments such as are capable of holding several gallons of food and water, these features may include a plurality of wheels 50 and a handle 60. In particular, a pair of wheels 50 are operatively mounted to the bottom wall 11 or a rear side wall 12 of the cooler 100, such as with respective castors 51 that enable wheel rotation (see FIG. 6). It is understood, however, that the wheels in some embodiments may be interconnected with an axle or may alternatively include respective wheel hubs. Moreover, the handle 60 is operatively coupled to a respective side wall 12 via a pair of couplers 61. Preferably, the handle 60 has a telescopic construction and is movable between a retracted configuration partially recessed within the couplers 61 and the side wall 12 and a deployed configuration extending vertically away from the couplers in a direction parallel to a respective side wall 12 and reaching a height suitable for pulling. The handle 60 may also include an ergonomic grip portion 62. If desirable, a button may be located within the grip portion 62, which when actuated, is configured to deploy or retract the handle 60. In alternative embodiments, the couplers 61 may be configured to allow handle 60 rotation. In such embodiments, the handle 60 is rotatable between a lowered configuration lying flat along the respective side wall 12 and a deployed configuration extending away from the respective side wall 12.

The disclosure of the present invention is enhanced by harmonizing the accompanying illustrations and claims. The present invention discloses a pair of lid portions that are essentially stacked one atop the other and include length, width, and thickness dimensions that are substantially identical or congruent to one another. More particularly, the first lid portion 30 is an innermost or lowermost portion and having a length and width that defines a generally rectangular geometric configuration that covers a pair of cooler compartments in a sealed friction fit relationship. The first lid portion 30 may define an imaginary horizontal plane and is pivotally coupled to an upper rear edge of the cooler housing, such as with one or more hinges that define a longitudinal axis. Similarly, the second portion 35 is the uppermost or outermost portion that also includes a length, width, and thickness that defines a generally rectangular geometric configuration that is substantially identical to that of the first lid portion 30, the second lid portion substantially covering an entirety of an upper surface of the first lid portion when resting thereon. The second portion is pivotally coupled to a rear edge of the first portion 30 with hinges that define a longitudinal axis, the respective hinges of respecting lid portions parallel to and displaced atop one another.

In use, the food and beverage containers may be filled and loaded prior to the cooler being transported in a vehicle or being pulled along a sidewalk, walking trail, or road to a destination such as a park for camping area. Then, at a minimum, the lid may be removed to allow access to the container portions, inverted/flipped over and water transferred from the beverage container to the water bowl where it may remain accessible for a period of time or throughout much of a day. Then, at an expected feeding time, food may be transferred from the food container in the cooler by the food bowl formed in the lid. Later on in the day or even after multiple days of a camping trip, the cooler and any remaining food and water may be pulled or lifted back into a vehicle or pulled along the sidewalk back to the pet owner's car or residence.

It is understood that while certain forms of this invention have been illustrated and described, it is not limited thereto except insofar as such limitations are included in the following claims and allowable functional equivalents thereof.

The invention claimed is:

1. A food and beverage cooler for pets, comprising:
   a cooler housing having a bottom wall and a plurality of sidewalls extending upwardly from said bottom wall that collectively define an open top and an interior compartment;
   a dividing wall separating said interior compartment into a first compartment portion configured to contain pet food and a second compartment portion configured to contain pet water; and
   a first lid portion having a rear edge pivotally coupled to an upper rear edge of said cooler housing, said first lid portion being pivotally movable between a closed configuration blocking access to said interior compartment and an open configuration allowing access to said interior compartment;
   a second lid portion having a rear edge pivotally coupled to the rear edge of said first lid portion and is pivotally movable between a closed configuration resting atop an upper surface of said first lid portion and an open configuration displaced from the upper surface of said first lid portion;
   wherein said first lid portion has a length and a width that defines a rectangular configuration that completely covers the interior compartment at said closed configuration, said first lid portion defining a first horizontal plane;

wherein said second lid portion has a length and a width that is at least equal to the length and width of the first lid portion, said second lid portion defining a rectangular configuration that completely covers said upper surface of said first lid portion when positioned at said closed configuration, said second lid portion defining a second horizontal plane that is parallel to and displaced from said first horizontal plane;

wherein said upper surface of said first lid portion defines a pair of recessed areas positioned laterally adjacent one another, each having a generally circular and concave configuration adapted configured to hold a single serving of the pet food or of the pet water;

wherein said first and second lid portions are pivotally movable between open and closed configurations via hinges, respectively, said respective hinges defining respective longitudinal axes that are situated atop one another at respective closed configurations.

2. The food and beverage cooler of claim 1, wherein said pair of recessed areas are accessible only when said first lid portion is in the closed configuration and said second lid portion is in said open configuration.

3. The food and beverage cooler of claim 1, further comprising a pair of bowls each having a collapsible sidewall removably positioned in each of said pair of recessed areas, respectively.

4. The food and beverage cooler of claim 1, further comprising a zippered pouch detachably mounted to a storage area defined by a bottom surface of said second lid portion, said zippered pouch having an upper edge configured to move between an open configuration allowing access to an interior area and a closed configurations not allowing access to the interior area.

5. The food and beverage cooler of claim 1, further comprising insulation mounted on at least a bottom side of said first lid portion and on at least interior surfaces of said sidewalls of said cooler housing walls so as to maintain a temperature of the water and food.

6. The food and beverage cooler of claim 5 further comprising a pair of seal members mounted to the bottom side of said first lid portion configured to create a watertight seal of said first and second compartment portions when said first lid portion is in said closed configuration.

7. The food and beverage cooler of claim 6, further comprising a latch mechanism fixedly attached at one end to said top surface of said second lid portion and that is operable to selectively secure said first and second lid portions at said closed configurations, respectively, when actuated.

8. The food and beverage cooler of claim 1, further comprising a plurality of wheels operatively coupled to said bottom wall of said cooler housing and by which the cooler housing is mobile.

9. The food and beverage cooler of claim 8, further comprising a handle coupled to a respective side wall of said cooler housing that is movable between a retracted configuration partially recessed into said respective side wall of said cooler housing and a deployed configuration extending away from said respective side wall for manually pulling the cooler on the ground.

10. A method of using a food and beverage cooler for pets during travel or outdoor activities, comprising:
providing a cooler housing having a bottom wall and a plurality of side walls extending upwardly from said bottom wall that, together, define an interior area and an open top, said interior area being divided by a partition into a first compartment portion;
placing pet food into said first compartment portion;
placing water into said second compartment portion;
selectively pivotally operating a first lid portion between a closed configuration blocking access to said interior area and an open configuration allowing access to said interior area, said first lid portion having a rear edge pivotally coupled to an upper rear edge of said cooler housing;
selectively pivotally operating a second lid portion between a closed configuration resting atop an upper surface of said first lid portion and an open configuration displaced from the upper surface of said first lid portion, said second lid portion having a rear edge pivotally coupled to the rear edge of said first lid portion;
wherein said first lid portion has a length and a width that defines a rectangular configuration that completely covers the interior compartment at said closed configuration, said first lid portion defining a first horizontal plane;
wherein said second lid portion has a length and a width that is at least equal to the length and width of the first lid portion, said second lid portion defining a rectangular configuration that completely covers said upper surface of said first lid portion when positioned at said closed configuration, said second lid portion defining a second horizontal plane that is parallel to and displaced from said first horizontal plane;
wherein said first and second lid portions are pivotally movable between open and closed configurations via hinges, respectively, said respective hinges defining respective longitudinal axes that are situated atop one another at respective closed configurations;
wherein said first lid portion includes an upper surface defining a pair of recessed areas laterally adjacent one another, each recessed area having a circular and concave configuration adapted to hold a single serving of the pet food or of the pet water;
wherein said second lid portion has a bottom side that defines at least one recessed area in which a zippered pouch defining an interior area is detachably mounted, said zippered pouch being selectively detachable from the second lid portion for cleaning or for accessing articles stored therein;
closing said first lid portion so as to create an insulating seal with said interior area.

11. The method of claim 10, further comprising transporting the cooler housing, said step of transporting the cooler housing including:
rolling the cooler on the ground via a plurality of wheels operatively coupled to a bottom surface of said bottom wall; and
utilizing a pull-up handle that is coupled to a respective side wall of said cooler housing and that is operably movable between a retracted configuration partially hidden within said respective side wall of said cooler housing and a deployed configuration extending away from said interior area.

12. The method of claim 11, further comprising a latch mechanism operable for selectively securing said second lid portion to said cooler housing during transport so as to prevent spillage of the cooler's contents.

13. The method of claim 10, further comprising insulating at least said first lid portion and said plurality of sidewalls so as to maintain the water and pet food at a predetermined temperature.

14. The method of claim 10, wherein said pair of recessed areas are accessible only when said first lid portion is at said closed configuration and said second lid portion is at said open configuration, respectively.

* * * * *